United States Patent
Nagasaka et al.

(10) Patent No.: US 10,440,767 B2
(45) Date of Patent: Oct. 8, 2019

(54) USER TERMINAL AND RADIO COMMUNICATION APPARATUS

(71) Applicant: KYOCERA Corporation, Kyoto-shi, Kyoto (JP)

(72) Inventors: Yushi Nagasaka, Ritto (JP); Akinori Iwabuchi, Machida (JP); Masato Fujishiro, Yokohama (JP); Katsuhiro Mitsui, Ritto (JP); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 50 days.

(21) Appl. No.: 15/728,210

(22) Filed: Oct. 9, 2017

(65) Prior Publication Data

US 2018/0035483 A1 Feb. 1, 2018

Related U.S. Application Data

(63) Continuation of application No. PCT/JP2016/061328, filed on Apr. 6, 2016.
(Continued)

(51) Int. Cl.
*H04W 76/16* (2018.01)
*H04W 36/30* (2009.01)
(Continued)

(52) U.S. Cl.
CPC ........... *H04W 76/16* (2018.02); *H04W 16/32* (2013.01); *H04W 28/085* (2013.01);
(Continued)

(58) Field of Classification Search
CPC ... H04W 16/32; H04W 28/10; H04W 28/085; H04W 72/0406; H04W 76/16;
(Continued)

(56) References Cited

U.S. PATENT DOCUMENTS

| 2009/0125650 | A1 | 5/2009 | Sebire |
| 2011/0176531 | A1 | 7/2011 | Rune et al. |

(Continued)

FOREIGN PATENT DOCUMENTS

| JP | 2012-504898 A | 2/2012 |
| JP | 2013-179712 A | 9/2013 |

(Continued)

OTHER PUBLICATIONS

European search report dated Feb. 7, 2018; issued in European Patent Application No. 16776598.1 by European Patent Office, 4 pages.

(Continued)

*Primary Examiner* — Vinncelas Louis

(57) ABSTRACT

A user terminal performs dual connectivity communication with a first base station and a second base station. The user terminal has a controller that performs a process of transmitting data belonging to a split bearer to the first base station via a first transmission path that passes through the first base station and via a second transmission path that passes through the second base station. When performing the process of transmitting the data to the first base station, the controller autonomously distributes the data to the first transmission path and the second transmission path without relying on an instruction from the first base station.

8 Claims, 7 Drawing Sheets

Related U.S. Application Data

(60) Provisional application No. 62/145,700, filed on Apr. 10, 2015.

(51) Int. Cl.
*H04W 16/32* (2009.01)
*H04W 28/10* (2009.01)
*H04W 72/04* (2009.01)
*H04W 28/08* (2009.01)
*H04W 88/06* (2009.01)

(52) U.S. Cl.
CPC ......... *H04W 28/10* (2013.01); *H04W 36/305* (2018.08); *H04W 72/0406* (2013.01); *H04W 88/06* (2013.01)

(58) Field of Classification Search
CPC ..... H04W 28/08; H04W 88/06; H04W 36/08; H04W 36/305
See application file for complete search history.

(56) References Cited

U.S. PATENT DOCUMENTS

| | | | |
|---|---|---|---|
| 2013/0176988 A1* | 7/2013 | Wang | H04W 28/08 370/331 |
| 2015/0230225 A1 | 8/2015 | Uchino et al. | |
| 2015/0327236 A1 | 11/2015 | Lin | |
| 2016/0234714 A1 | 8/2016 | Basu Mallick et al. | |
| 2016/0255537 A1 | 9/2016 | Uchino et al. | |
| 2016/0262149 A1* | 9/2016 | Futaki | H04W 16/32 |
| 2016/0286429 A1 | 9/2016 | Chen | |
| 2017/0111911 A1 | 4/2017 | Uchino et al. | |

FOREIGN PATENT DOCUMENTS

| | | |
|---|---|---|
| JP | 2013-187631 A | 9/2013 |
| JP | 2015-142302 A | 8/2015 |
| WO | 2011100492 A1 | 8/2011 |
| WO | 2014/034416 A1 | 3/2014 |
| WO | 2015020344 A1 | 2/2015 |
| WO | 2015159879 A1 | 10/2015 |

OTHER PUBLICATIONS

Japanese Office Action dated Jan. 23, 2018, issued in Japanease Patent Application No. 2017-511040 by Japanese Patent Office, with Concise Explanation. 5 pages.

Kyocera, "User plane aspects to support uplink split bearer", 3GPP TSG-RAN WG2 #85-bis R2-141392, Apr. 4, 2014, Valencia, Spain.

Ericsson, "RRC procedures and L2 handling in dual connectivity", 3GPP TSG-RAN WG2 #87 Tdoc R2-143505, Aug. 22, 2014, Dresden, Germany.

Kyocera, "User plane aspects to support uplink split bearer", 3GPP TSG-RAN WG2 #87 Tdoc R2-143505, Apr. 24, 2015, Bratislava, Slovakia.

Huawei, HiSilicon, "User plane enhancement for uplink bearer split", 3GPP TSG-RAN WG2 Meeting #89bis, R2-151180, Apr. 24, 2015, Bratislava, Slovakia.

3rd Generation Partnership Project; Technical Specification Group Radio Access Network; Evelved Universal Terrestrial Radio Access (E-UTRA) and Evolved Universal Terrestrial Radio Access Network (E-UTRAN); Overall description; Stage 2 (Release 12), 3GPP TS 36.300 V12.5.0 (Mar. 2015).

International Search Report (Form PCT/ISA/210) dated Jun. 28, 2016, issued for PCT/JP2016/061328. 9 pages.

3rd Generation Partnership Project, "Technical Specification Group Radio Access Network; Study on Small Cell enhancements for E-UTRA and E-UTRAN; Higher layer aspects (Release 12)", 3GPP TR 36.842 V12.0.0 (Dec. 2013), 71 pages.

Mediatek Inc., "BSR and LCP for Dual Connectivity", R2-140197, 3GPP TSG-RAN2 #85 Meeting, Feb. 2014, Prague, Czech Republic, 4 pages.

Intel Corporation, "BSR Transmission for Dual Connected UEs", R2-134281, 3GPP TSG-RAN2 Meeting #84, Nov. 2013, San Francisco, USA, 5 pages.

Panasonic, "Logical channel prioritization for dual connectivity", R2-133943, 3GPP TSG RAN WG2 Meeting #84, Nov. 2013, San Francisco, USA, 4 pages.

Panasonic, "BSR Reporting Options for Dual Connectivity", R2-133935, 3GPP TSG RAN WG2 #84, Nov. 2013, San Francisco, USA, 5 pages.

Pantech, "Considerations on signaling for separated DRA function", R2-132503, 3GPP TSG RAN WG2 Meeting #83, Aug. 2013, Barcelona, Spain, 5 pages.

* cited by examiner

USER TERMINAL AND RADIO COMMUNICATION APPARATUS

CROSS-REFERENCE TO RELATED APPLICATION

The present application is a continuation based on PCT Application No. PCT/JP2016/061328 filed on Apr. 6, 2016, which claims the benefit of U.S. provisional application No. 62/145,700 (Apr. 10, 2015). The content of which is incorporated by reference herein in their entirety.

FIELD

The present application relates to a user terminal and a radio communication apparatus in a mobile communication system.

BACKGROUND

In 3GPP (3rd Generation Partnership Project) which is a project aiming to standardize a mobile communication system, dual connectivity communication has been specified. The dual connectivity communication is a communication mode in which a master cell group (MCG) and a secondary cell group (SCG) are set to a user terminal in an RRC (Radio Resource Control) connected mode. The MCG is a serving cell group managed by a maser base station. The SCG is a serving cell group managed by a secondary base station.

Further, in a scheme of transferring user data in the dual connectivity communication, a total of three types of bearers, that is, an MCG bearer, an SCG bearer, and a split bearer, are defined. The MCG bearer is a bearer in which a corresponding radio protocol is present only in the maser base station and which uses only a resource of the maser base station. The SCG bearer is a bearer in which a corresponding radio protocol is present only in the secondary base station and which uses only a resource of the secondary base station. The split bearer is a bearer in which a corresponding radio protocol is present both in the maser base station and the secondary base station and which uses both resources of the maser base station and the secondary base station.

SUMMARY

A user terminal according to one embodiment performs dual connectivity communication with a first base station and a second base station. The user terminal comprises a controller configured to perform a process of transmitting data belonging to a split bearer to the first base station via a first transmission path passing through the first base station and a second transmission path passing through the second base station. The controller is configured to when performing the process of transmitting the data to the first base station, autonomously distribute the data to the first transmission path and the second transmission path without relying on an instruction from the first base station.

A communication method according to one embodiment is a communication method used in a user terminal configured to perform dual connectivity communication with a first base station and a second base station. The communication method comprises: transmitting data belonging to a split bearer to the first base station via a first transmission path passing through the first base station and a second transmission path passing through the second base station; and when transmitting the data to the first base station, autonomously distributing the data to the first transmission path and the second transmission path without relying on an instruction from the first base station.

An apparatus according to one embodiment is an apparatus provided in a user terminal configured to perform dual connectivity communication with a first base station and a second base station. The apparatus comprises a processor and a memory communicatively coupled to the processor. The processor configured to execute the processes of: transmitting data belonging to a split bearer to the first base station via a first transmission path passing through the first base station and a second transmission path passing through the second base station; and when transmitting the data to the first base station, autonomously distributing the data to the first transmission path and the second transmission path without relying on an instruction from the first base station.

DESCRIPTION OF THE EMBODIMENT

Overview of Embodiment

Figure 1:
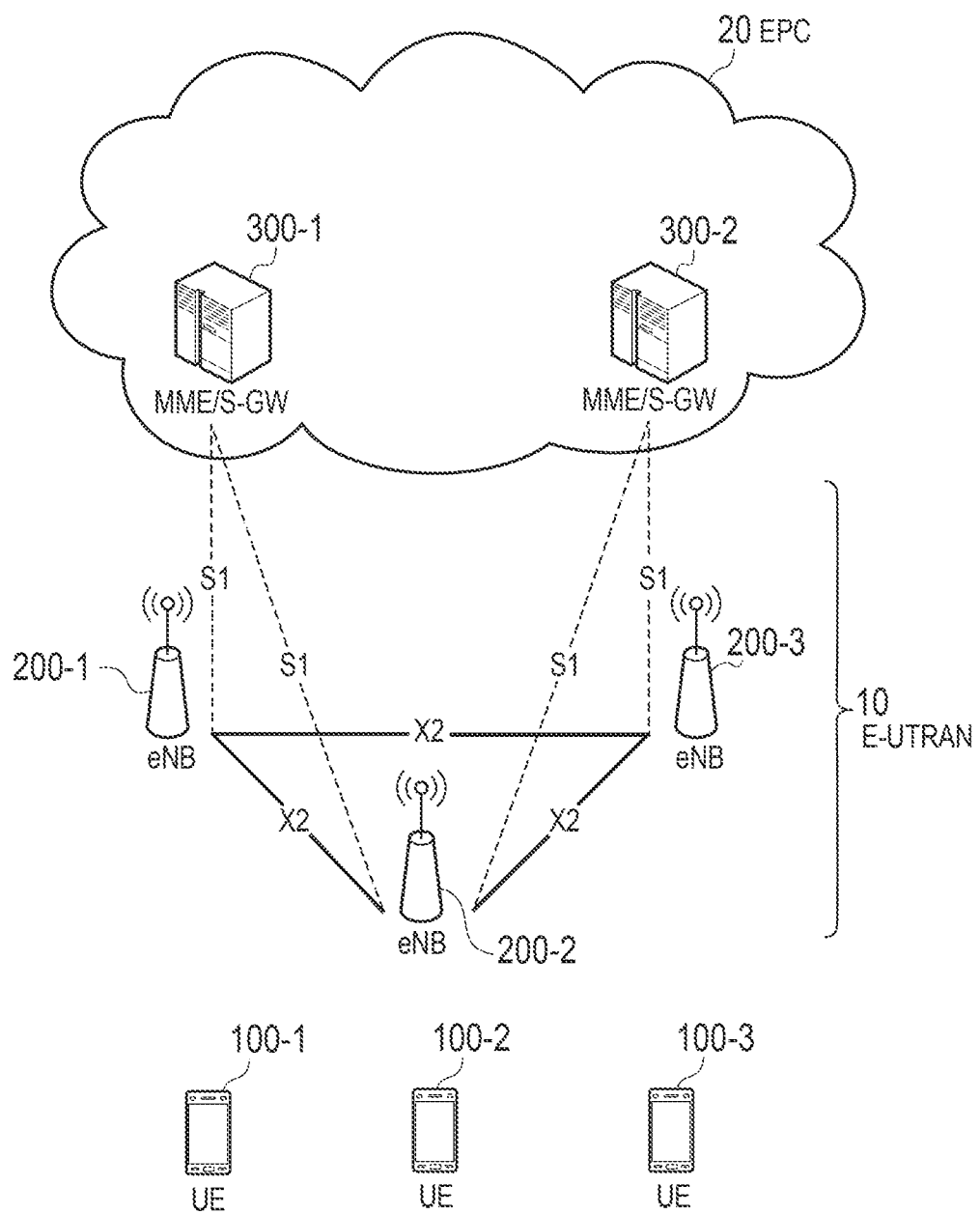
FIG. 1 is a diagram illustrating a configuration of a mobile communication system according to an embodiment.

In the 3GPP Release 12, a split bearer in an uplink does not essentially function. Specifically, for the split bearer in the uplink, only either one of uplink paths, that is, a first transmission path (MCG path) for performing transmission from a user terminal to a maser base station and a second transmission path (SCO path) for performing transmission from the user terminal to a secondary base station, is statically set by an RRC message. That is, in the specification of the Release 12, it is not possible to simultaneously use both the first transmission path and the second transmission path.

However, in the 3GPP Release 12 and later, an attempt may be made to enhance the split bearer in the uplink. As a result, both the first transmission path and the second transmission path can be used simultaneously.

The following embodiments disclose a user terminal and a radio communication apparatus capable of enhancing a split bearer in an uplink.

A user terminal according to a first embodiment performs dual connectivity communication with a first radio communication apparatus and a second radio communication apparatus. The user terminal comprises a controller configured to perform a process of transmitting data belonging to a split bearer to the first radio communication apparatus via a first transmission path for performing transmission to the first radio communication apparatus and a second transmission path for performing transmission to the second radio communication apparatus. The controller autonomously determines a data transmission ratio between the first transmission path and the second transmission path without relying on an instruction from the first radio communication apparatus.

A user terminal according to a second embodiment performs dual connectivity communication with a first radio communication apparatus and a second radio communication apparatus. The user terminal comprises a controller configured to transmit data belonging to a split bearer to the first radio communication apparatus via a first transmission path for performing transmission to the first radio communication apparatus and a second transmission path for performing transmission to the second radio communication apparatus. A plurality of schemes are defined for a scheme of determining a data transmission ratio between the first transmission path and the second transmission path. The controller determines the data transmission ratio by using a scheme selected from the plurality of schemes.

A first radio communication apparatus according to the second embodiment performs, together with a second radio communication apparatus, dual connectivity communication with a user terminal. The first radio communication apparatus comprises a controller configured to receive data belonging to a split bearer via a first transmission path for performing transmission from the user terminal to the first radio communication apparatus and a second transmission path for performing transmission from the user terminal to the second radio communication apparatus. A plurality of schemes are defined for a scheme of determining a data transmission ratio between the first transmission path and the second transmission path. The controller selects one scheme out of the plurality of schemes and transmitting setting information indicating the selected scheme to the user terminal.

A user terminal according to a third embodiment performs dual connectivity communication with a first radio communication apparatus and a second radio communication apparatus. The user terminal comprises a controller configured to transmit data belonging to a split bearer to the first radio communication apparatus via a first transmission path for performing transmission to the first radio communication apparatus and a second transmission path for performing transmission to the second radio communication apparatus. The controller, upon detection of a radio link failure with the second radio communication apparatus, reassigns, to the first transmission path, transmission incomplete data assigned to the second transmission path.

[Mobile Communication System]

Hereinafter, an LTE system that is a mobile communication system according to first to third embodiments will be described.

(Configuration of System)

FIG. 1 is a diagram illustrating a configuration of a LTE system that is a mobile communication system according to the embodiments.

As illustrated in FIG. 1, the LTE (Long Term Evolution) system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

(Configuration of Radio Protocol)

Figure 2:
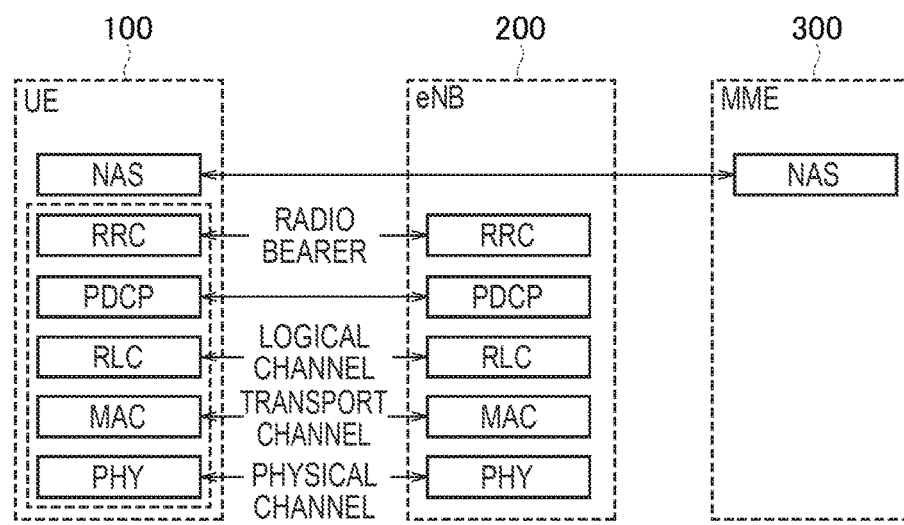
FIG. 2 is a protocol stack diagram of a radio interface in an LTE system.

FIG. 2 is a protocol stack diagram of a radio interface in the LTE system.

As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode (connected mode), otherwise the UE 100 is in an RRC idle mode (idle mode).

A NAS (Non-Access Stratum) layer positioned above the RRC layer performs a session management, a mobility management and the like.

(Configuration of User Terminal)

Figure 3:
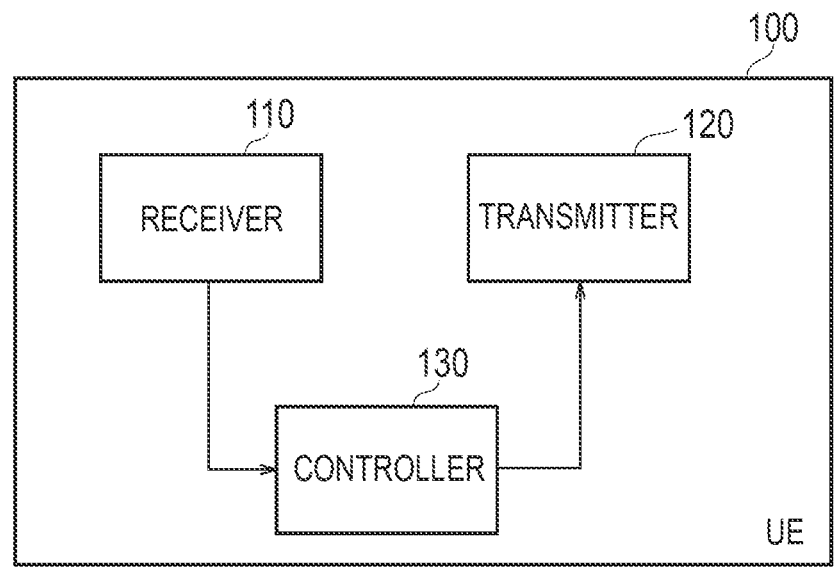
FIG. 3 is a block diagram of a UE 100 (user terminal) according to the embodiment.

FIG. 3 is a block diagram of a configuration of the UE 100 (user terminal). As illustrated in FIG. 3, the UE 100 includes a receiver 110, a transmitter 120, and a controller 130.

The receiver 110 performs various types of reception under the control of the controller 130. The receiver 110 includes an antenna and a receiving machine. The receiving machine converts a radio signal received by the antenna into a baseband signal (reception signal) and outputs it to the controller 130.

The transmitter 120 performs various types of transmission under the control of the controller 130. The transmitter 120 includes an antenna and a transmitting machine. The transmitting machine converts a baseband signal (transmission signal) output from the controller 130 into a radio signal and transmits it from the antenna.

The controller 130 performs various controls in the UE 100. The controller 130 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor may include a codec for encoding/decoding audio/video signals. The processor executes various processes described later and various communication protocols described above.

(Configuration of Base Station)

Figure 4:
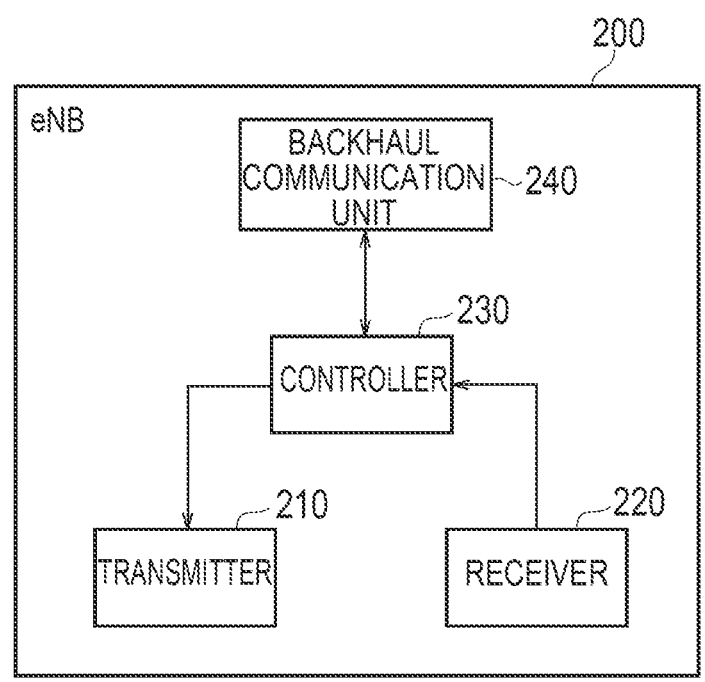
FIG. 4 is a block diagram of an eNB 200 (base station) according to the embodiment.

FIG. 4 is a block diagram of the eNB 200. As illustrated in FIG. 4, the eNB 200 includes a transmitter 210, a receiver 220, a controller 230, and a backhaul communication unit 240.

The transmitter 210 performs various transmissions under the control of the controller 230. The transmitter 210 includes an antenna and a transmitting machine. The transmitting machine converts a baseband signal (transmission signal) output from the controller 230 into a radio signal and transmits it from the antenna.

The receiver 220 performs various types of reception under the control of the controller 230. The receiver 220 includes an antenna and a receiving machine. The receiving machine converts a radio signal received by the antenna into a baseband signal (reception signal) and outputs it to the controller 230.

The controller 230 performs various controls in the eNB 200. The controller 230 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor executes various processes described later and various communication protocols described above.

The backhaul communication unit 240 is connected to an adjacent eNB 200 via the X2 interface, and is connected to the MME/S-GW 300 via an S1 interface. The backhaul communication unit 240 is used for communication performed on the X2 interface, communication performed on the S1 interface, and the like.

[Dual Connectivity Communication According to Embodiments]

Figure 5:
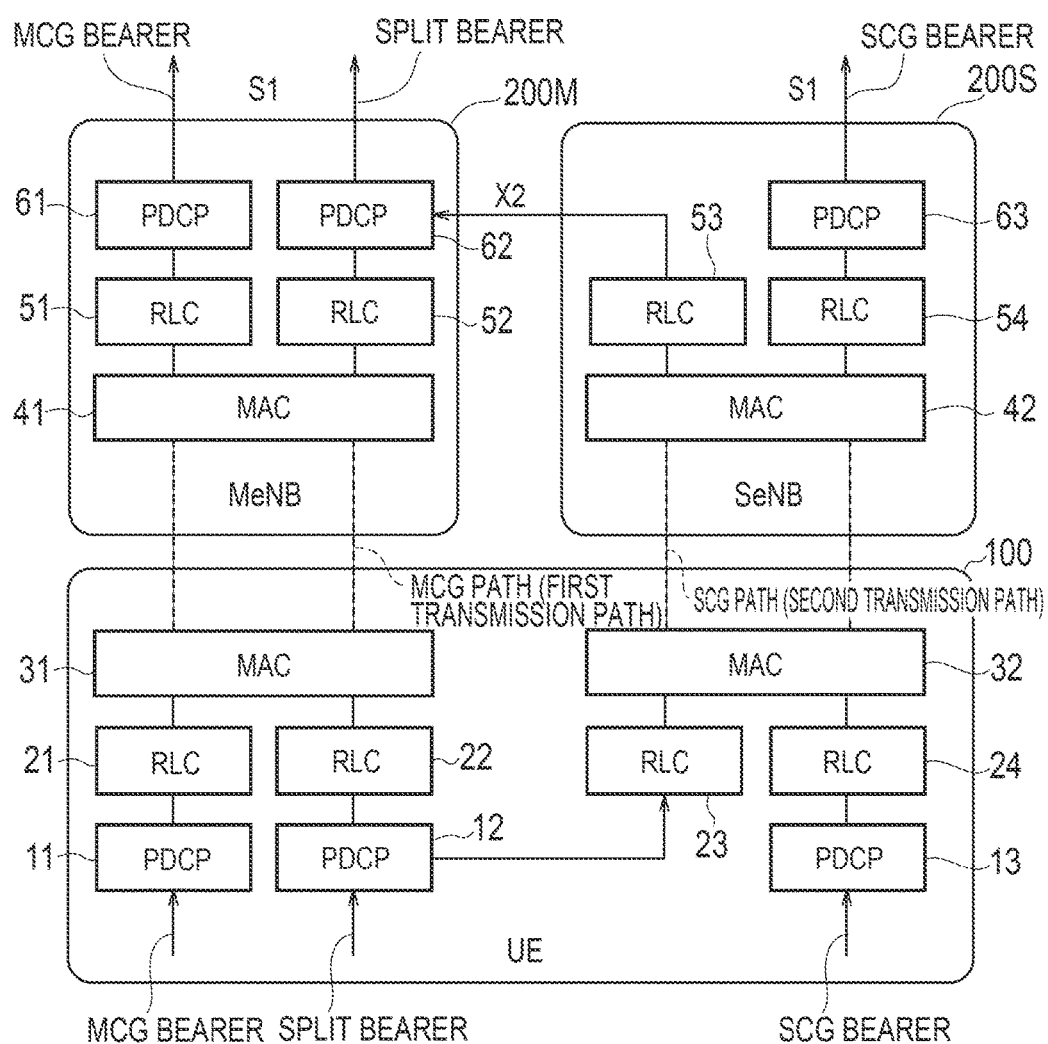
FIG. 5 is a diagram illustrating dual connectivity communication in an uplink according to the embodiment.

FIG. 5 is a diagram illustrating dual connectivity communication in the uplink according to the embodiment. It is noted that, FIG. 5 illustrates a protocol stack of a user plane. In FIG. 5, illustration of an entity of the physical layer is omitted.

As illustrated in FIG. 5, the dual connectivity communication is a communication mode in which a master cell group (MCG) and a secondary cell group (SCG) are set to the UE 100 in the RRC connected mode. The MCG is a serving cell group managed by an MeNB 200M (master base station). The SCG is a serving cell group managed by an SeNB 200S (secondary base station). The UE 100 is connected to the MeNB 200M and the SeNB 200S, and allocated with resources by each of a scheduler of the MeNB 200M and a schedular of the SeNB 200S. In the embodiment, the MeNB 200M (master base station) corresponds to a first radio communication apparatus, and the SeNB 200S (secondary base station) corresponds to a second radio communication apparatus.

The MeNB 200M has the RRC connection with the UE 100, and can transmit and receive the RRC message to and from the UE 100. The SeNB 200S does not have the RRC connection with the UE 100, and cannot transmit and receive the RRC message to and from the UE 100. For example, the MeNB 200M may be a macro cell base station, and the SeNB 200M may be a small cell base station.

The MeNB 200M and the SeNB 200S are connected mutually via the X2 interface. Each of the MeNB 200M and the SeNB 200S is connected to an S-GW via the S1 interface (S1-U interface). The MeNB 200M is connected to the MME via the S1 interface (S1-MME interface).

In the dual connectivity communication, a total of three types of bearers (data bearers), that is, an MCG bearer, an SCG bearer, and a split bearer are defined.

Data belonging to the MCG bearer is processed in order of a PDCP entity 11, an RLC entity 21, and a MAC entity 31 of the UE 100, and transmitted to the MeNB 200M. The data belonging to the MCG bearer is processed in order of a MAC entity 41, an RLC entity 51, and a PDCP entity 61 of the MeNB 200M, and transferred to the S-GW.

Data belonging to the SCG bearer is processed in order of a PDCP entity 13, an RLC entity 24, and a MAC entity 32 of the UE 100, and transmitted to the SeNB 200S. The data belonging to the SCG bearer is processed in order of a MAC entity 42, an RLC entity 54, and a PDCP entity 63 of the SeNB 200S, and transferred to the S-GW.

Data belonging to the split bearer is distributed, in the PDCP entity 12 of the UE 100, to an RLC entity 22 for the MeNB 200M (MCG) and an RLC entity 23 for the SeNB 200S (SCG). Specifically, the PDCP entity 12 converts a PDCP SDU (Service Data Unit) into a PDCP PDU (Protocol Data Unit), and distributes each of the PDCP PDU to either one of the RLC entity 22 and the RLC entity 23 (routing). In other words, the PDCP entity 12 distributes the data belonging to the split bearer to a first transmission path for performing transmission to the MeNB 200M (hereinafter, referred to as "MCG path") and a second transmission path for performing transmission to the SeNB 200M (hereinafter, referred to as "SCG path").

In the MCG path, the RLC entity 22 receives the PDCP PDU distributed by the PDCP entity 12 as an RLC SDU, converts the RLC SDU into an RLC PDU, and outputs the RLC PDU to the MAC entity 31. The MAC entity 31 receives the RLC PDU output from the RLC entity 22 as a MAC SDU, converts the MAC SDU into a MAC PDU, and transmits the MAC PDU to the MeNB 200M via a physical layer entity (not illustrated).

In the SCG path, the RLC entity 23 receives the PDCP PDU distributed by the PDCP entity 12 as an RLC SDU, converts the RLC SDU into an RLC PDU, and outputs the RLC PDU to the MAC entity 32. The MAC entity 32 receives the RLC PDU output from the RLC entity 23 as a MAC SDU, converts the MAC SDU into a MAC PDU, and transmits the MAC PDU to the SeNB 200S via the physical layer entity (not illustrated).

Further, in the SCG path, the MAC entity 42 of the SeNB 200S receives the MAC PDU via the physical layer entity (not illustrated), converts the MAC PDU into an MAC SDU, and outputs the MAC SDU to an RLC entity 53. The RLC entity 53 receives the MAC SDU output from the MAC entity 42 as an RLC PDU, converts the RLC PDU into an RLC SDU, and outputs the RLC SDU to a PDCP entity 62 of the MeNB 200M via the X2 interface.

On the other hand, in the MCG path, the MAC entity 41 of the MeNB 200M receives the MAC PDU via the physical layer entity (not illustrated), converts the MAC PDU into a MAC SDU, and outputs the MAC SDU to an RLC entity 52. The RLC entity 52 receives the MAC SDU output from the MAC entity 41 as an RLC PDU, converts the RLC PDU into an RLC SDU, and outputs the RLC SDU to the PDCP entity 62.

The PDCP entity 62 receives the RLC SDU output from the RLC entity 52 of the MeNB 200M as a PDCP PDU (MCG path), while receiving the RLC SDU output from the RLC entity 53 of the SeNB 200S as a PDCP PDU (SCO path). The PDCP entity 62 performs a reordering process (that is, PDCP reordering) of the PDCP PDU (MCG path) and the PDCP PDU (SCO path), while converting the PDCP PDU into a PDCP SDU.

First Embodiment

Figure 6:
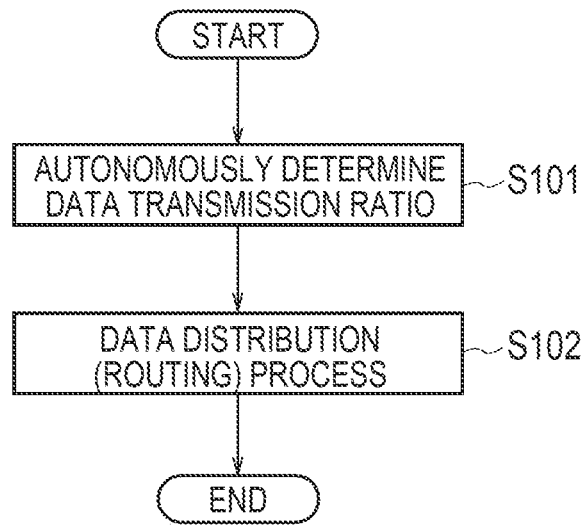
FIG. 6 is a flowchart illustrating an operation of the UE 100 (user terminal) according to a first embodiment.

Hereinafter, a first embodiment will be described.
(Operation Flow According to First Embodiment)
FIG. 6 is a flow diagram illustrating an operation of the UE 100 (user terminal) according to the first embodiment. The controller 130 of the UE 100 according to the first embodiment performs a process of transmitting, to the MeNB 200M, the data belonging to the split bearer via the MCG path for performing transmission to the MeNB 200M and the SCG path for performing transmission to the SeNB 200M. The flow illustrated in FIG. 6 may be executed repeatedly.

As illustrated in FIG. 6, in step S101, the controller 130 autonomously determines a data transmission ratio between the MCG path and the SCG path without relying on an instruction from the MeNB 200M. As described above, the PDCP entity 12 of the UE 100 distributes the PDCP PDU to the RLC entity 22 (MCG path) and the RLC entity 23 (SCO path). The controller 130 autonomously determines, under a premise that the MCG path and the SCG path are simultaneously used, a rate at which the PDCP PDU is distributed to the RLC entity 22 (MCG path) and the RLC entity 23 (SCO path). The determination may be performed by the PDCP entity 12, or may be performed by an entity other than the PDCP entity 12 (for example, an RRC entity of the UE 100).

The controller 130 determines the data transmission ratio by at least one of the following methods.

In the first method, the controller 130 determines the data transmission ratio, based on a buffer amount of data which have not yet been transmitted to the MeNB 200M, and a buffer amount of data which have not yet been transmitted to the SeNB 200M. The buffer amount of data which have not yet been transmitted to the MeNB 200M is the buffer amount of data in the MCG path. The data in the MCG path is at least one of a PDCP PDU (RLC SDU), an RLC PDU (MAC SDU), and a MAC PDU, distributed to the MCG path. Further, the buffer amount of data which have not yet been transmitted to the SeNB 200M is the buffer amount of data in the SCG path. The data in the SCG path is at least one of a PDCP PDU (RLC SDU), an RLC PDU (MAC SDU), and a MAC PDU, distributed to the SCG path. The controller 130 may increase the data transmission ratio of the path with a smaller buffer amount among the MCG path and the SCG path. The controller 130 may decrease the data transmission ratio of the path with a larger buffer amount among the MCG path and the SCG path.

In the second method, the controller 130 determines the data transmission ratio, based on a radio quality parameter between the MeNB 200M and the UE 100, and a radio quality parameter between the SeNB 200M and the UE 100. The radio quality parameter is, for example, a received power or a reception quality of a reference signal of the downlink, error rate, and the like. However, not only such radio quality parameters of the physical layer, but also a radio quality parameter (such as throughput) of a layer 2 may be used. The controller 130 may increase the data transmission ratio of the path with a better radio quality parameter among the MCG path and the SCG path. The controller 130 may decrease the data transmission ratio of the path with a poorer radio quality parameter among the MCG path and the SCG path.

In the third method, the controller 130 determines the data transmission ratio, based on the situation of resource allocation from the MeNB 200M to the UE 100, and the situation of resource allocation from the SeNB 200M to the UE 100. The situation of resource allocation is mainly a situation of an uplink radio resource allocation (UL grant). The controller 130 may increase the data transmission ratio of the path with more resource allocation among the MCG path and the SCG path. The controller 130 may decrease the data transmission ratio of the path with less resource allocation among the MCG path and the SCG path. Alternatively, the controller 130 may increase the data transmission ratio of the path with the resource allocation and decrease the data transmission ratio of the path with no resource allocation, among the MCG path and the SCG path.

In the fourth method, the controller 130 determines the data transmission ratio, based on an upper limit value of an uplink bit rate between the MeNB 200M and the UE 100 and an upper limit value of an uplink bit rate between the SeNB 200M and the UE 100. The upper limit value of the uplink bit rate is, for example, a "Maximum Bit Rate" set for each cell. The controller 130 may increase the data transmission ratio of the path with a larger upper limit value of the uplink bit rate among the MCG path and the SCG path. The controller 130 may decrease the data transmission ratio of the path with a smaller upper limit value of the uplink bit rate among the MCG path and the SCG path.

Next, in step S102, the controller 130 (PDCP entity 12) distributes, according to the data transmission ratio determined in step S101, the PDCP PDU to the RLC entity 22 (MCG path) and the RLC entity 23 (SCG path).

(Summary of First Embodiment)
In the first embodiment, the UE 100 autonomously determines the data transmission ratio between the MCG path and the SCG path without relying on an instruction from the MeNB 200M. Thus, the data transmission ratio adapted to the situation of the UE 100 can be dynamically determined.

Further, it is possible to avoid an increase of signaling between the MeNB 200M and the UE 100.

Second Embodiment

A second embodiment will be described while focusing on differences from the first embodiment, below. In the second embodiment, a case is assumed where a plurality of schemes are defined for a scheme of determining the data transmission ratio between the MCG path and the SCG path.

(Operation Sequence According to Second Embodiment)

Figure 7:
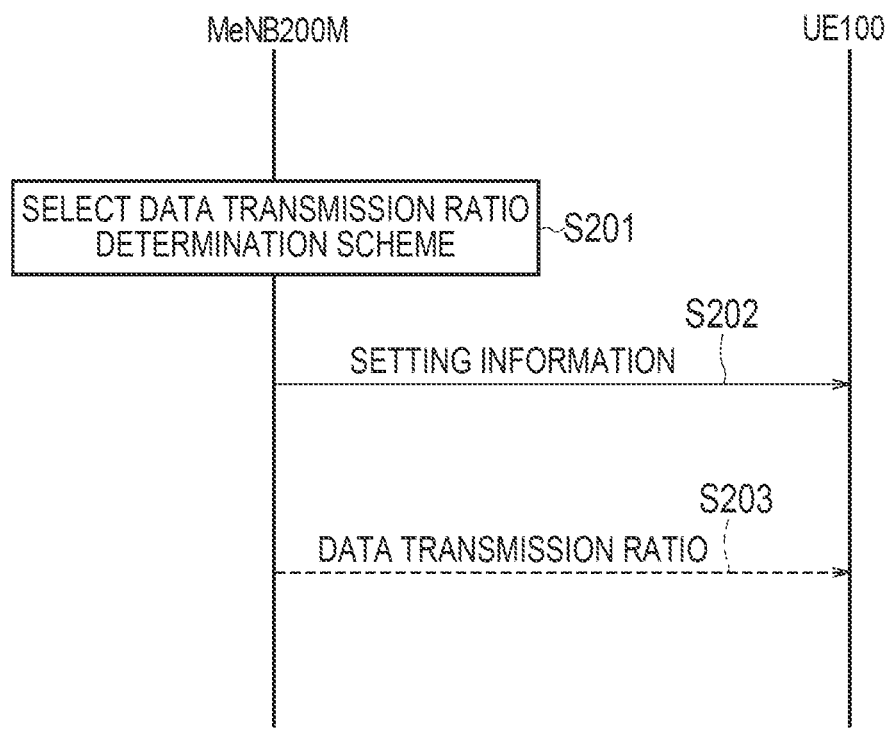
FIG. 7 is a sequence diagram illustrating an operation sequence according to a second embodiment.

FIG. 7 is a sequence diagram illustrating an operation sequence according to the second embodiment.

As illustrated in FIG. 7, in step S201, the controller 230 of the MeNB 200M selects one scheme out of a plurality of schemes of determining the data transmission ratio between the MCG path and the SCG path (hereinafter, referred to as "MCC and SGG ratio determination scheme").

The plurality of MCC and SGG ratio determination schemes include a scheme in which the data transmission ratio is set from the MeNB 200M and a scheme in which the UE 100 autonomously determines the data transmission ratio. The scheme in which the data transmission ratio is set from the MeNB 200M is an MeNB 200M-initiated scheme. The scheme in which the UE 100 autonomously determines the data transmission ratio is the scheme described in the first embodiment.

Further, the MeNB 200M-initiated scheme includes a scheme in which the data transmission ratio is statically set from the MeNB 200M, by signaling of the RRC layer, and a scheme in which the data transmission ratio is dynamically or quasi-statically set from the MeNB 200M, by signaling of a lower layer than the RRC layer. In the former case, a fixed value of the data transmission ratio is set to the UE 100, by the signaling of the RRC layer. In the latter case, the MeNB 200M determines the data transmission ratio in accordance with a report from the UE 100. It is noted that the signaling of the lower layer than the RRC layer is, for example, signaling of the PDCP layer.

The controller 230 of the MeNB 200M may select one scheme out of the plurality of MCC and SGG ratio determination schemes, based on QCI (QoS Class Identifier) information associated with the split bearer. For example, if the required QoS is low, the controller 230 determines that the necessity of considering a delay (propagation delay) in the X2 interface is low, and selects the scheme in which the UE 100 autonomously determines the data transmission ratio. On the other hand, if the required QoS is high (in particular, for data whose delay can be fatal), the controller 230 determines that the necessity of considering the delay (propagation delay) in the X2 interface is high, and selects the MeNB 200M-initiated scheme (the scheme in which the data transmission ratio is dynamically or quasi-statically set, by signaling of the PDCP layer, or the scheme in which the data transmission ratio is statically set by signaling of the RRC layer). It is noted that the controller 230 of the MeNB 200M may acquire in advance or may regularly measure a delay time of the X2 interface.

The controller 230 of the MeNB 200M may select one scheme out of the plurality of MCC and SGG ratio determination schemes, based on the delay situation of the X2 interface between the MeNB 200M and the SeNB 200M. If the delay of the X2 interface is small, the controller 230 considers that it is unnecessary to dynamically set the data transmission ratio, and selects the scheme of statically setting the data transmission ratio by signaling of the RRC layer. On the other hand, if the delay of the X2 interface is large, the controller 230 considers that it is highly necessary to dynamically set the data transmission ratio, and selects the scheme of dynamically or quasi-statically setting the data transmission ratio, by signaling of the PDCP layer, or the scheme in which the UE 100 autonomously determines the data transmission ratio.

In step S202, the controller 230 of the MeNB 200M transmits, to the UE 100, setting information indicating the MCC and SGG ratio determination scheme selected in step S201. The setting information may include not only an identifier of the MCC and SGG ratio determination scheme, but also an identifier of a subject bearer (split bearer). Further, the setting information may be transmitted by individual RRC signaling (for example, an "RRC Connection Reconfiguration" message).

The controller 130 of the UE 100 performs a process of receiving, from the MeNB 200M, the setting information indicating the MCC and SGG ratio determination scheme selected by the MeNB 200M, and determines the data transmission ratio by using the MCC and SGG ratio determination scheme selected by the MeNB 200M. If the MeNB 200M-initiated scheme is selected, the controller 130 of the UE 100 performs a process of receiving information indicating the data transmission ratio determined by the MeNB 200M (step S203). On the other hand, if the UE-initiated scheme described in the first embodiment is selected, the controller 130 of the UE 100 performs a process of autonomously determining the data transmission ratio.

(Summary of Second Embodiment)

As described above, according to the second embodiment, it becomes possible to use, from among the plurality of MCC and SGG ratio determination schemes, an optimum scheme in accordance with the situation.

Third Embodiment

A third embodiment will be described while focusing on the differences from the first embodiment and the second embodiment, below.

The third embodiment relates to an operation in a case where the UE 100 detects a radio link failure with the SeNB 200S (S-RLF), under the situation of performing the dual connectivity communication according to the first embodiment and the second embodiment.

(Operation Sequence According to Third Embodiment)

Figure 8:
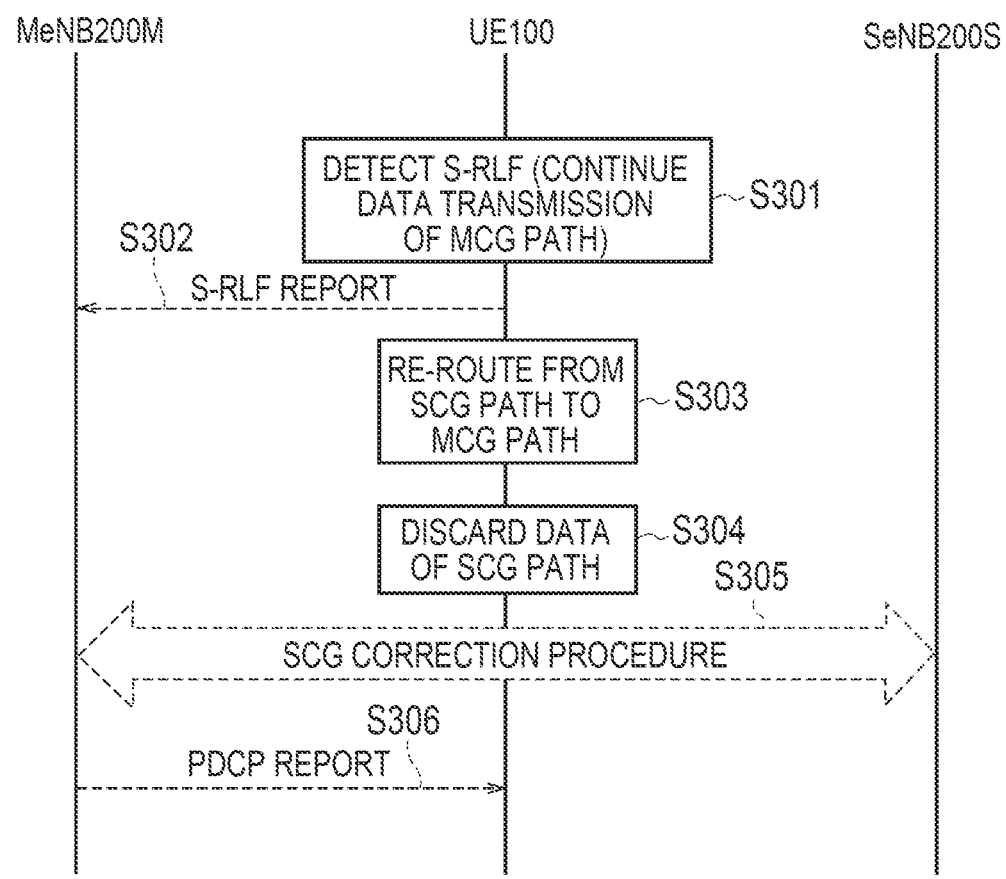
FIG. 8 is a sequence diagram illustrating an operation sequence according to a third embodiment.

FIG. 8 is a sequence diagram illustrating an operation sequence according to the third embodiment.

As illustrated in FIG. 8, in step S301, the controller 130 of the UE 100 detects a radio link failure with the SeNB 200M (S-RLF). For example, an RLF (S-RLF) with a primary secondary cell (PSCell) included in the SCG is detected. As a result, data transmission via the SCG path becomes disabled, however, data transmission via the MCG path is continued. The controller 130 of the UE 100 may transmit, to the MeNB 200M, a report on the S-RLF (step S302).

Transmission incomplete data assigned to the SCG path is not transmitted to the MeNB 200M due to the generation of the S-RLF, so that the PDCP reordering in the MeNB 200M does not complete, and the buffer for the PDCP reordering can overflow.

Therefore, in step S303, the controller 130 of the UE 100 reassigns the transmission incomplete data assigned to the SCG path, to the MCG path (re-routing process). As a result, the transmission incomplete data assigned to the SCG path is transmitted to the MeNB 200M via the MCG path.

As described above, the controller 130 of the UE 100 includes, the PDCP entity 12 configured to perform data assignment between the MCG path and the SCG path, the RLC entity 22 (first RLC entity) configured to transmit, to the MeNB 200M, data assigned to the MCG path by the PDCP entity 12, and an RLC entity 23 (second RLC entity) configured to transmit, to the SeNB 200M, data assigned to the SCG path by the PDCP entity. The transmission incomplete data assigned to the SCG path is data (PDCP PDU) for which a transmission completion (Successful Delivery Indication) is not notified from the RLC entity 23 to the PDCP entity 12.

In the re-routing process, the PDCP entity 12 may recreate a PDCP PDU from the PDCP SDU for which the "Successful Delivery Indication" is not notified, and assign the PDCP PDU to the RLC entity 22 (MCG path). It is noted that, the PDCP entity 12 retains the PDCP SDU (PDCP PDU) without being discarded, until the "Successful Delivery Indication" is notified. Alternatively, in the re-routing process, the PDCP entity 12 or the RLC entity 23 may control the PDCP PDU (RLC SDU) retained by the RLC entity 23 to be transferred to the RLC entity 22.

In step S304, the RLC entity 23 (second RLC entity) corresponding to the SCG path discards the retained RLC SDU (transmission incomplete data). If the RLC entity 23 keeps retaining the RLC SDU (transmission incomplete data), upon the SeNB 200S (SCG) being recovered, same data may be transmitted to the MeNB 200M in duplicate. Here, the PDCP already has a function of discarding double transmission, however, an appropriate process may not be performed for an SN (Sequence Number) that exceeds a window size. In particular, it is quite possible that data exceeding this window size is stocked in the buffer of the MeNB 200M, before the SeNB 200S recovers from the S-RLF. Further, in the existing specification, a process for retransmitting the PDCP PDU (PDCP Data Recovery) is not executed until an RRC reconfiguration is performed, and hence, the above-described problem cannot be solved. Therefore, a problem on such duplication can be avoided by discarding the RLC SDU (transmission incomplete data) by the RLC entity 23.

In step S305, the MeNB 200M and the SeNB 200S may perform an SCG correction procedure for modifying the primary secondary cell (PSCell) included in the SCG. However, the SCG correction procedure is not essential, and the SCG correction procedure may not be performed. Thus, the SeNB 200S (SCG) recovers, and dual connectivity communication is restarted.

In step S306, the controller 230 (PDCP entity 62) of the MeNB 200M notifies the UE 100 of a PDCP state report indicating data (PDCP PDU or PDCP SDU) not yet received in the MeNB 200M. The controller 130 (PDCP entity 12) of the UE 100 acquires the PDCP state report from the MeNB 200M. Thus, the controller 130 (PDCP entity 12) of the UE 100 can grasp the PDCP PDU (or the PDCP SDU) that has already been transmitted to the MeNB 200M, and control not to transmit the PDCP PDU (or the PDCP SDU) that has already been transmitted to the MeNB 200M.

(Summary of Third Embodiment)

As described above, the UE 100 reassigns, in a case of detecting an S-RLF, the transmission incomplete data assigned to the SCG path, to the MCG path. Thus, it is possible to prevent the buffer for PDCP reordering in the MeNB 200M from overflowing.

[Modification of Third Embodiment]

After an elapse of a certain time since detection of a radio link failure with the SeNB 200M, the controller 130 of the UE 100 may reassign the transmission incomplete data assigned to the SCG path, to the MCG path. That is, instead of performing the re-routing process immediately after detecting an S-RLF, the re-routing process is performed after waiting for a predetermined timer period. Thus, when the SeNB 200S (SCG) recovers within the timer period, the transmission incomplete data assigned to the SCG path can be transmitted to the SeNB 200S with the SCG path. The timer period may be specified by the MeNB 200M in advance.

Further, after an elapse of the certain time since detection of the radio link failure with the SeNB 200M, the controller 130 (RLC entity 23) of the UE 100 may discard the retained RLC SDU (transmission incomplete data). That is, instead of discarding the RLC SDU (transmission incomplete data) immediately after detecting of the S-RLF, the RLC SDU (transmission incomplete data) is discarded after waiting for a predetermined timer period. Thus, when the SeNB 200S (SCO) recovers within the timer period, the transmission incomplete data assigned to the SCG path can be transmitted to the SeNB 200S with the SCG path. The timer period may be specified by the MeNB 200M in advance.

Other Embodiments

The above-described first embodiment to third embodiment may be performed individually and may also be performed by combining two or more of the embodiments.

In each of the above-described embodiments, the LTE system is exemplified as the mobile communication system, and LTE communication is exemplified as WWAN communication. However, the present application is not limited to the LTE system. The present application may be applied to a mobile communication system other than the LTE system.

In each of the above-described embodiments, an example where the MeNB 200M (master base station) corresponds to the first radio communication apparatus and the SeNB 200S (secondary base station) corresponds to the second radio communication apparatus has been described. However, each of the above-described embodiments may be applied to dual connectivity communication with a base station and a WLAN node (LTE and WLAN aggregation communication). That is, in each of the above-described embodiments, the MeNB 200M may be replaced with a base station, and the SeNB 200M may be replaced with a WLAN node. The WLAN node includes a WLAN access point (AP). The WLAN node may include a WLAN access controller (AC). Further, if the each of the above-described embodiments is applied to the LTE and WLAN aggregation communication, the WLAN node may be a type of node integrated with the base station. Further, in the LTE and WLAN aggregation communication, the RLC is not present on the WLAN side, and the RLC is replaced with an entity corresponding to the RLC in the WLAN. The entity corresponding to the RLC is, for example, an IEEE MAC (WLAN MAC).

APPENDIX (Introduction)

In this appendix, the details of user plane aspects of uplink split bearer are discussed and some recommendations are provided.

(MAC to Support Uplink Split Bearer)

(Scheduling Request and Buffer Status Report)

As already agreed in Rel-12, MAC entities in the UE are configured per cell group, i.e. one MAC for MCG and one MAC for SCG. The structure allows independent scheduling processes in each eNB as well as possibly re-using existing mechanisms. Furthermore, in order to maximize the benefit from dual scheduler in dual eNBs, entirely independent operation of their respective MACs should be supported. This also reduces the required coordination between the two eNBs over X2. To satisfy the above principles, the existing mechanisms should be reused to support uplink split bearer.

Proposal 1: The existing SR/BSR mechanism should be reused to support UL split bearer.

(Logical Channel Prioritization)

There were two options proposed and discussed, i.e. common bucket and separate buckets. The common bucket option may be beneficial to ensure the required QoS of the split bearer is met since it's not clear how the PBR values are configured in the case of two separate buckets. On the other hand the separate bucket option is consistent with the existing mechanism, so specification impact would be substantially reduced and independent process of MAC may be supported.

In Rel-12, RAN2 specified split bearers are only supported for RLC AM. This limitation derives from following agreement which RAN2 reached:

RLC UM bearers is not supported in split mode.

The agreement means GBR bearers are not configured with split bearer, so there's no benefit for using the common bucket option to reduce UE complexity With the separate bucket option, it facilitates independent process and QoS control may be handled in higher layers, i.e. PDCP and/or RRC.

Proposal 2: Separate bucket mechanism should be supported for each cell group for UL split bearer.

Another issue that should be addressed from the network's perspective is the handling of the re-ordering process at the MeNB's PDCP layer which may have limited buffer size. This should be accounted for as part of the support for uplink split bearer.

To avoid buffer overflow at PDCP re-ordering process in the MeNB, the uplink packet delivery on split bearer needs to consider different latency performances between the MeNB path and the SeNB path, which is caused by differences in radio conditions and X2 latency.

As a baseline, prioritization of the SCG part of the split bearer should be prioritized over the MCG part of the split bearer. However this may be handled by eNB implementation.

Proposal 3: Prioritization of the SCG part over the MCG part of the split bearer is necessary to avoid PDCP buffer overflow, but it may be handled by eNB implementation.

(PDCP to Support Uplink Split Bearer)

(Scaling of Two Routes)

Data available for transmission was discussed and option 3 was described as a mechanism to allow for differences in the data routing function to the MCG or SCG, i.e. how the PDCP PDU is delivered towards MCG or SCG. Based on the discussion, there is no decision on how to handle the scaling between the two routes when data is available for transmission. The following four alternatives may be considered for scaling:

Alt. 1: RRC configuration provides a fixed value of the scaling of the packet-delivering routes, e.g. 30%:70%. This option is simple, but it cannot easily adapt to the changing conditions of both links, e.g. throughput and/or latency. RRC Connection Reconfiguration will be needed to change the scaling values.

Alt. 2: Scheduler in MeNB provides dynamic/semi-static value of the scaling, taking into account of the changing conditions of both links. This option may be more complicated and may require increased overheads, but more gain is expected.

Alt 3: UE decides the ratio by itself (UE implementation). UE may decide the ratio considering amount of buffer status for MCG/SCG, radio condition, throughput via each CG and whether there is UL grant or not.

Alt 4:MeNB selects one solution from multiple solutions above. MeNB may decide on which solution to use depending on e.g. how critical the X2 delay.

Proposal 4: It should discuss which of the above alternatives should be adopted for scaling between MCG path and SCG path for packet delivering on split bearer.

(Discard Rule Considering Two Routes)

According to current specification, PDCP discard occurs under the following conditions.

"5.4 PDCP discard

When the discardTimer expires for a PDCP SDU, or the successful delivery of a PDCP SDU is confirmed by PDCP status report, the UE shall discard the PDCP SDU along with the corresponding PDCP PDU. If the corresponding PDCP PDU has already been submitted to lower layers the discard is indicated to lower layers."

The above mechanism assumes one data path, i.e. MCG bearer or SCG bearer in dual connectivity.

Observation 1: The existing PDCP discard mechanism assumes one data path, i.e. can be re-used for MCG bearer and SCG bearer.

Observation 2: It needs to be clarified whether existing PDCP discard mechanism can be reused for split bearer.

One of the main benefits with split bearer is the opportunity to deliver the packets using two paths. While the existing mechanism may also work for split bearer, in order to deliver the packet efficiently and without unnecessarily discarding of PDCP SDU/PDUs at the UE, possible enhancement should be considered. For example, it's a common understanding that SCG will be deployed as small cells, i.e. pico-cells or femto-cells, and that mobility robustness is more reliable between the MCG and the UE rather than between the SCG and the UE. When the UE moves towards the cell edge of the SCG, the PDCP SDU/PDUs attempting to transmit towards the SCG will not be expected to be delivered successfully. Instead, the PDCP SDU/PDUs should be re-routed towards the MCG with better mobility robustness, in order to avoid unnecessary discarding of the SDU/PDUs. The following 3 options may be considered to achieve this benefit:

1. Introduce a new rule to allow re-routing when the discard timer expires. For example, the UE attempts to retransmit the associated PDCP SDU/PDUs towards the other cell group when the timer expires, and when the same timer expires once again the UE discards the PDCP SDU/PDUs.

2. Introduce dual discard timers for each cell groups. With this option the UE can decide whether the PDCP SDU/PDUs should be re-transmitted towards the other cell group (when one timer expires) or discarded (when both timers expire).

3. Introduce dual discard timers for re-routing and discard. With this option the UE should try to re-transmits the PDCP SDU/PDUs which have not yet been delivered successfully and starts the second timer when the first timer expires. Then, the UE discards the PDCP SDU/PDUs when the second timer expires.

Figure 9:
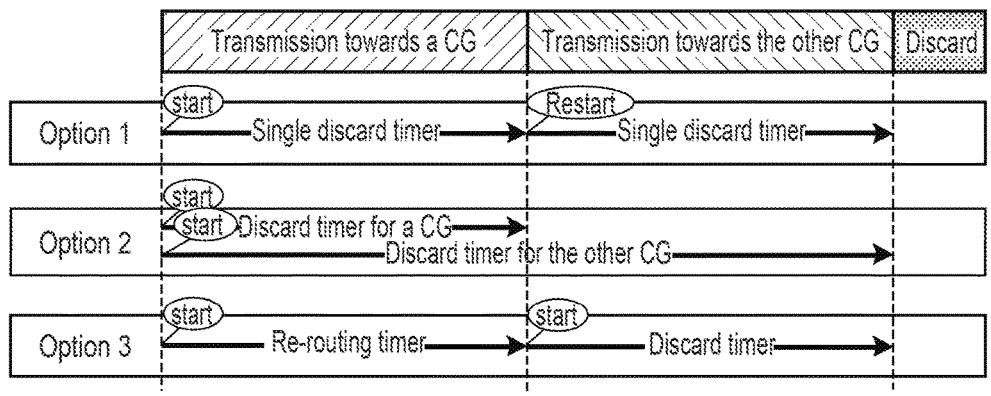
FIG. 9 is a diagram illustrating a rerouting mechanism option according to a note.

The three options are depicted in FIG. 9.

Options 2 and 3 have more flexibility in the timer configurations, while Option 1 can be configured with only a single timer value and the same timer is used twice. For example, it may be assumed the radio link towards the SeNB has more capacity, e.g. per-user throughput, than that towards the MeNB, because the SeNB is typically assumed as small cells. In the case, the discard timer for the SeNB should be configured with a shorter timer than that for the MeNB, in order to avoid unnecessary extension of time to keep the PDCP SDU/PDUs. The same dual-timer configuration can also work well assuming the radio condition with the SeNB may be worse than the radio condition with the MeNB due to UE mobility. Therefore, either option 2 or 3, with dual discard timers, would be more suitable to realize the potential gain.

Proposal 5: RAN2 should introduce dual discard timer for split bearer.

(SCG-RLF Case Considering Two Routes)

In Rel-12, it was agreed that the UE shall suspend all SCG DRBs and suspend SCG transmission for split DRBs upon detection of SCF-RLF but there is no restriction to the MCG transmission for split DRBs. This behaviour corresponds to RAN2 agreement.

3 The data transfer for a split bearer over the MeNB is maintained upon S-RLF.

In Rel-12, UE actually sends uplink split bearer only towards one eNB, either MeNB or SeNB. In the case the UE sends the uplink to the SeNB but SCG-RLF is subsequently detected, the UE should redirect the transmission of all PDCP packets towards the MeNB and suspend transmission of all PDCP packets towards SeNB. However, if the UE transmits part of PDCP packet transmission towards MeNB while some packet for SeNB is suspended, since PDCP is not re-established, this may result in buffer overflow at the MeNB.

To resolve this issue, the UE should autonomously re-route the pending PDCP PDUs at the SeNB towards the MeNB without RRC Reconfiguration. Then buffer overflow can be avoided. Detection of SCG-RLF is a good indication to the UE that such re-routing to the MeNB is needed. The existing procedure for PDCP re-establishment may be reused in this scenario.

Proposal 6: SCG-RLF should be used as an indication to the UE that all unacknowledged PDCP packets should be re-routed to the MeNB.

After SCG-RLF is detected, there is a possibility that the SeNB is resumed through SCG change procedure. In this case, UE may send the same packet through SeNB although the packet is already received by MeNB. In order to avoid this duplication, SCG-RLC in the UE should discard its SDU upon SCG-RLF. To prevent duplication in the PDCP layer, the MeNB should provide the PDCP Status report towards the UE upon resuming SeNB operation so that the UE will only send unacknowledged PDCP packets towards the SeNB.

Proposal 7: SCG-RLC in the UE should discard its SDU upon SCG-RLF.

Proposal 8: To prevent duplication in the PDCP layer, MeNB should provide the PDCP Status report towards the UE upon resuming SeNB operation.

CONCLUSION

In this appendix, the support of uplink split bearer by the MAC and PDCP layers is further analysed from both the UE and the network's perspectives. At MAC layer, separate bucket option is proposed.

At PDCP layer, options for handling the scaling issue are suggested. Furthermore, it is proposed that dual discard timers for re-routing the PDCP data units should be adopted.

Re-routing the PDCP data units upon detection of SCG-RLF is also discussed. We have the following observations and proposals.

INDUSTRIAL APPLICABILITY

The present application is useful in the field of communication.

The invention claimed is:

1. A user terminal configured to perform dual connectivity communication with a first base station and a second base station, comprising:
a controller configured to perform a process of transmitting data belonging to a split bearer to the first base station via a first transmission path passing through the first base station and a second transmission path passing through the second base station, wherein
the controller is configured to:
when performing the process of transmitting the data to the first base station, autonomously distribute the data to the first transmission path and the second transmission path without relying on an instruction from the first base station, and
the controller is further configured to:
determine whether a radio link failure (RLF) with the second base station is detected,
in response to determining that the RLF is detected, start a timer configured by the first base station, and
when the timer expires, reassign transmission incomplete data assigned to the second transmission path, to the first transmission path.

2. The user terminal according to claim 1, wherein
the controller is configured to autonomously determine a data transmission ratio between the first transmission path and the second transmission path without relying on an instruction from the first base station, and
the controller is configured to distribute the data to the first transmission path and the second transmission path in accordance with the determined data transmission ratio.

3. The user terminal according to claim 2, wherein the controller is configured to determine the data transmission ratio, based on a buffer amount of data which have not yet been transmitted to the first base station and a buffer amount of data which have not yet been transmitted to the second base station.

4. The user terminal according to claim 2, wherein the controller is configured to determine the data transmission ratio, based on a radio quality parameter between the first base station and the user terminal and a radio quality parameter between the second base station and the user terminal.

5. The user terminal according to claim 2, wherein the controller is configured to determine the data transmission ratio, based on an upper limit value of an uplink bit rate between the first base station and the user terminal and an upper limit value of an uplink bit rate between the second base station and the user terminal.

6. The user terminal according to claim 1, wherein
the controller is configured to distribute the data to the first transmission path and the second transmission path, based on a situation of resource allocation from the first base station to the user terminal and a situation of resource allocation from the second base station to the user terminal.

7. A communication method used in a user terminal configured to perform dual connectivity communication with a first base station and a second base station, comprising:

transmitting data belonging to a split bearer to the first base station via a first transmission path passing through the first base station and a second transmission path passing through the second base station;

when transmitting the data to the first base station, autonomously distributing the data to the first transmission path and the second transmission path without relying on an instruction from the first base station;

determining whether a radio link failure (RLF) with the second base station is detected:

in response to determining that the RLF is detected, starting a timer configured by the first base station;

when the timer expires, reassigning transmission incomplete data assigned to the second transmission path, to the first transmission path.

8. An apparatus provided in a user terminal configured to perform dual connectivity communication with a first base station and a second base station, comprising:

a processor and a memory communicatively coupled to the processor, the processor configured to execute the processes of:

transmitting data belonging to a split bearer to the first base station via a first transmission path passing through the first base station and a second transmission path passing through the second base station;

when transmitting the data to the first base station, autonomously distributing the data to the first transmission path and the second transmission path without relying on an instruction from the first base station;

determining whether a radio link failure (RLF) with the second base station is detected;

in response to determining that the RLF is detected, starting a timer configured by the first base station;

when the timer expires, reassigning transmission incomplete data assigned to the second transmission path, to the first transmission path.

\* \* \* \* \*